Figure 1:
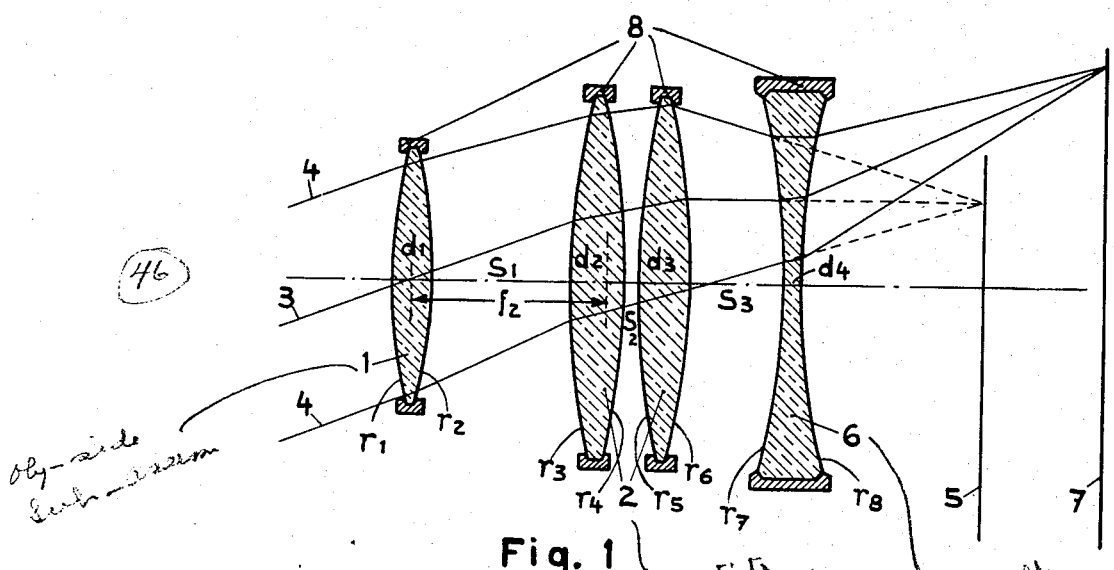

March 13, 1956  H. TILLER  2,737,849
PHOTOGRAPHIC OBJECTIVE
Filed Aug. 22, 1951  2 Sheets-Sheet 1

INVENTOR.
HANS TILLER
BY
HIS ATTORNEY

United States Patent Office 2,737,849
Patented Mar. 13, 1956

2,737,849
PHOTOGRAPHIC OBJECTIVE

Hans Tiller, Zurich, Switzerland, assignor to Cycloptic Anstalt für Optik und Mechanik, Vaduz, Liechtenstein Application August 22, 1951, Serial No. 243,065

Claims priority, application Switzerland August 22, 1950

5 Claims. (Cl. 88—57)

This invention relates to optical objectives for photographic and projection purposes.

An object of the invention is to provide an objective lens array having a variable sized image field as compared to the diameter of the normally last image-side lens of the array.

A further object of the invention is to maintain a high light intensity over the entire image field of a lens array with larger and smaller sized images.

Still a further object of the invention is to produce increased brilliance of the image field for smaller image sizes.

Optical lens systems for photographic and projection purposes composed of two subassemblies at fixed distance from each other, in which the rear main plane of the front object-side subassembly coincides exactly or approximately with the front focal plane of the rear, image-side subassembly, and in which the diameter of the lenses of the rear subassembly are of such magnitude that essentially all of the principal rays, emerging from the front subassembly and incident on the rear subassembly, pass through the rear subassembly without interference from the lens mounts, so that no or substantially no vignetting or shadowing occurs, are prior known. In such lens arrays, the principal rays passing into the front subassembly are deflected by the rear subassembly toward the optical axis and emerge from the rear subassembly exactly, or substantially, parallel to the optical axis. The focal length of the whole of such lens array is essentially controlled by the rear subassembly and the aperture and the image distance, that is, the distance from the last lens vertex of the rear assembly to the plane of the image, is essentially controlled by the front subassembly. In such objectives the image field is fixed; the image field diagonals for exactly parallel emergent principal rays from the second subassembly, having a maximum magnitude which is equal to the diameter of the last lens of the second subassembly, while for not exactly parallel emergence of such principal rays, the image field departs somewhat from said lens diameter.

The objective of the instant invention permits obtaining of a larger or smaller image field while retaining the advantages of the prior known objectives.

I accomplish the foregoing and obvious other objects of this invention by making the objective of my invention of three subassemblies at fixed distances from each other, having the rear main plane of the object-side subassembly coincide, at least approximately, with the front focal plane of the intermediate subassembly, making the diameters of the lenses of the intermediate subassembly of such magnitude that essentially all of the principal rays incident on this subassembly and deflected by it toward the optical axis, pass through this intermediate subassembly without interference from the lens mounts and emerge therefrom at least substantially parallel the optical axis, and so dimensioning and spacing the third subassembly that such emerging principal rays are substantially all deflected in either direction as selected by this third image-side subassembly. The third or image-side subassembly may be a converging or a diverging lens array; if diverging or negative the image field is larger, and if converging, or positive, is smaller, than for the case of the axially parallel emergence of the principal rays.

Figure 2:
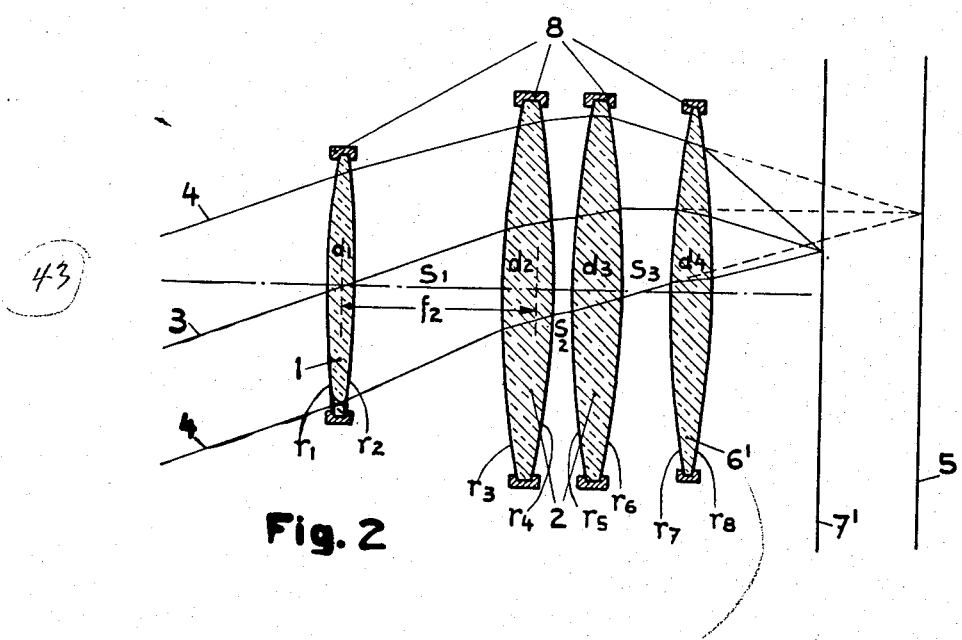
Figure 3:
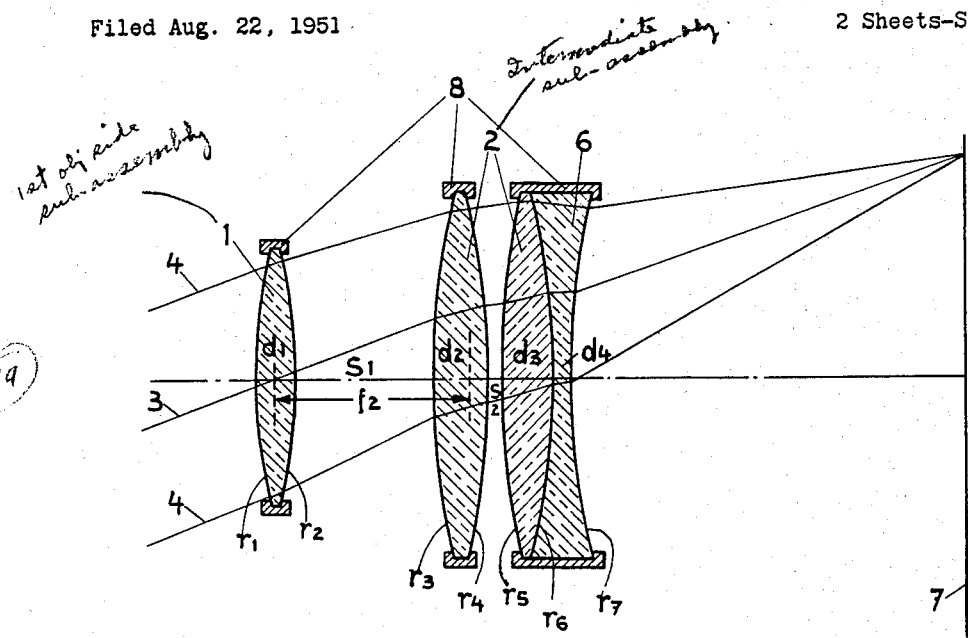
Figure 4:
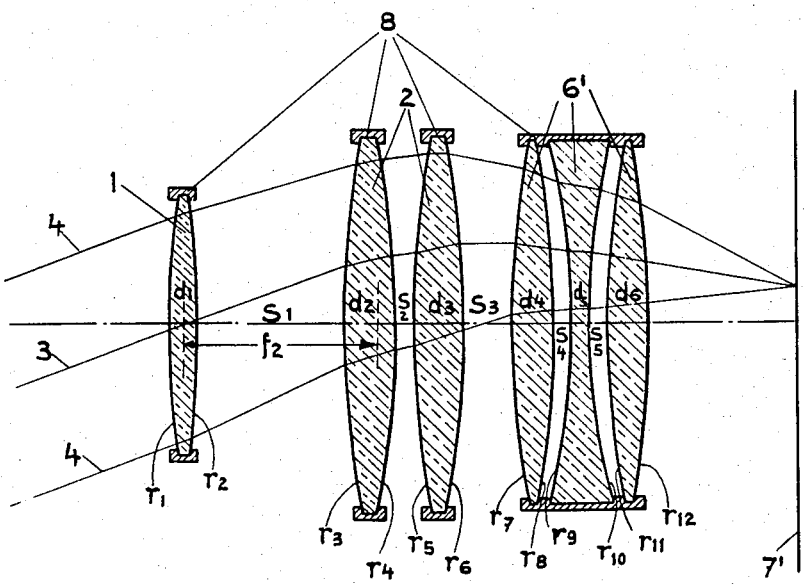

Illustrative embodiments of the invention are shown in the accompanying drawing in which Figure 1 shows a negative image-side subassembly air spaced from the intermediate subassembly, Figure 2 a positive image-side subassembly consisting of a single lens, Figure 3 is a modification of the structure of Figure 1 with the negative image-side subassembly lens cemented to the intermediate subassembly, and Figure 4 is a modification of the structure of Figure 2 in which the positive image-side subassembly consists of an array of lenses.

The objective has an object-side subassembly 1 whose rear main plane coincides with the front focal plane of the intermediate subassembly 2. In such arrangement, the principal rays 3 entering the front subassembly emerge from the intermediate subassembly parallel to the axis. Hence the principal rays 3, provided the two subassemblies 1 and 2 were completely corrected, would together with the pencils of rays 4 form an image in the image plane 5.

In Figure 1, by the interposition of the additional, or third, lens subassembly 6, which for simplicity is shown as a single negative lens but may comprise several lenses, the pencils of emergent light are deflected away from the optical axis. The negative lens system increases the distance from the last vertex of the rear assembly to the plane of the image and the image is formed in the image plane 7, which is further to the right, that is at a greater distance from the subassembly 2, than the original image plane 5. Thus by the divergence of the principal rays after emerging from subassembly 6, the image field has been increased as compared to the image field which would have been produced in the image field 5.

Figure 2 discloses an illustrative embodiment in which the image-side third subassembly is a positive lens system 6', which again is shown as a single lens for ease of illustration but may be an array of lenses, as shown in Figure 4. This positive lens system produces a shortening of the distance from the last vertex of the rear assembly to the plane of the image and thus a decrease of the image field which is now formed in the image plane 7' closer to subassembly 2 than the original image plane 5.

The third subassembly, diverging or converging, may be positioned at a fixed distance from the second subassembly but may also, particularly when using a negative or diverging subassembly or a single negative lens, be cemented to the second subassembly, as shown in Figure 3. As indicated in the drawing, the clear diameters of lens system 2 is such that substantially all of the principal rays emerging from subassembly 1 pass unhindered and unobstructed through the subassembly 2 and through the third subassembly 6 and 6' too.

It follows that the instant invention consists in causing the principal rays incident on the object-side subassembly to emerge from the second, or intermediate, subassembly substantially parallel to the optical axis of the objective. Such parallelism will occur only when the distance between the rear principal plane of the object-side subassembly and the front focal plane of the intermediate subassembly is substantially equal to the focal length of the second subassembly. In the instant objective, the third or image-side subassembly is axially aligned beyond the intermediate subassembly and either bends the rays towards the optical axis (Figures 2 and 4) or away from the optical axis (Figures 1 and 3). And since an image must be produced by the objective, the focal length of the object-side subassembly must be greater than the distance between the rear principal plane of the first and the front focal plane of the second subassemblies, and the third subassembly must be positioned within the total focal length of the object-side and intermediate subassemblies, that is, between the intermediate subassembly and the image plane 7, for otherwise no image would be formed. And so that all of the principal rays incident on the intermediate subassembly, that is, those which emerge from the first subassembly, can pass unimpededly into the second subassembly, the diameter of the second subassembly must be greater than the diameter of the first subassembly for otherwise not all of the principal rays passing through the first, object-side, subassembly would also pass through the intermediate subassembly.

Expressed mathematically then, for an angle $\alpha$ of the incident light to the optical axis, and for a diameter $D$ of the second subassembly, the required relation is that $$\tan \alpha = \frac{\frac{1}{2}D}{f_2}$$

where $f_2$ is the distance between the rear principal plane of the first subassembly and the front focal plane of the intermediate subassembly. Hence clearing terms $$D = 2f \tan \alpha$$

Hence the maximum value of $\alpha$ expresses the required diameter of the intermediate subassembly to obtain maximum illumination at the image, providing, of course, that the image-forming third subassembly also passes all the rays, that is, is at least substantially of the diameter of the second subassembly.

By way of numerical example of photographic objectives according to the invention consisting of three subassemblies, assume a field angle of 36° and a focal length of 1.00 of the objectives. With a focal length of the intermediate subassembly of 0.68, the diameter $D$ of the second assembly would be $D = 2 \times 0.68 \times 0.7265 = 0.988$.

By virtue of the described positioning of the object-side and intermediate subassemblies, practically no vignetting or shadowing losses are produced within the intermediate subassembly because essentially all of the rays enter the intermediate subassembly from the object-side subassembly without hindrance or interference and thus the light brilliancy over the entire image field is uniform, whether photographing objects at infinite or at finite distances. In that with the instant objective all of rays emerging from the intermediate assembly pass without interference and unhindered into the image-side subassembly, 6 or 6', the instant objective retains the stated advantages and there is no vignetting or shadowing. Thus with the objective of the instant invention there has become practical and possible the retention of the advantage of uniform high light intensity over the entire image field for both larger and smaller image sizes than is possible with prior known objectives of the described two subassembly type. The use of the new objective lens array for smaller image sizes thus permits obtaining extraordinary brilliancy of the images and an increase in the relative aperture relations.

What I claim is:

1. A photographic objective comprising a first object-side subassembly consisting of at least one positive lens, a second subassembly of lenses axially aligned with and spaced from the first subassembly, the distance between the rear principal plane of the first subassembly and the front focal plane of the second subassembly being substantially equal to the focal length of the second subassembly and the focal length of the first subassembly being greater than the distance of the first subassembly from the second subassembly, the diameter of the second subassembly being greater than the diameter of the first subassembly and of the magnitude $$D \geq 2f \tan \alpha$$

where $f$ is the focal length of the second subassembly and $\alpha$ is half the field angle of the objective for which the objective has been corrected whereby all principal rays incident on the first subassembly at angles from 0° to $\alpha$° pass through the second subassembly unimpededly by the lens mounts, and a third subassembly axially aligned with the first and second subassemblies and positioned between the second subassembly and the image plane defined by the first and second subassembly, the diameter of the third subassembly being at least substantially equal to the diameter of the second subassembly.

2. A photographic objective according to claim 1 in which the third subassembly is a positive lens.

3. A photographic objective according to claim 1 in which the third subassembly is a negative lens of which the diameter exceeds the diameter of the second subassembly.

4. A photographic objective according to claim 1 in which the third subassembly consists of a plurality of lenses.

5. A photographic objective according to claim 1 in which the third subassembly is cemented to the second subassembly.

References Cited in the file of this patent

UNITED STATES PATENTS

| | | |
|---|---|---|
| 599,700 | Goerz et al. | Mar. 1, 1898 |
| 1,154,232 | Byron | Sept. 21, 1915 |
| 1,572,236 | Frederick | Feb. 9, 1926 |
| 1,593,786 | Worthington | July 27, 1926 |
| 1,605,016 | Trezise | Nov. 2, 1926 |
| 1,955,850 | Hallett et al. | Apr. 24, 1934 |
| 2,000,470 | Miller | May 7, 1935 |
| 2,055,859 | Dieterich | Sept. 29, 1936 |
| 2,215,271 | May | Sept. 17, 1940 |
| 2,274,974 | Buckley | Mar. 3, 1942 |
| 2,313,460 | Warmisham | Mar. 9, 1943 |
| 2,651,970 | Tiller | Sept. 15, 1953 |